(12) United States Patent
Yamamoto et al.

(10) Patent No.: US 9,812,744 B2
(45) Date of Patent: Nov. 7, 2017

(54) BATTERY PACK AND BATTERY PACK APPARATUS

(71) Applicant: DENSO CORPORATION, Kariya, Aichi-pref. (JP)

(72) Inventors: Hiroyoshi Yamamoto, Nagoya (JP); Yoshimitsu Inoue, Chiryu (JP); Takashi Kawashima, Nagoya (JP)

(73) Assignee: DENSO CORPORATION, Kariya (JP)

( * ) Notice: Subject to any disclaimer, the term of this patent is extended or adjusted under 35 U.S.C. 154(b) by 157 days.

(21) Appl. No.: 14/288,684

(22) Filed: May 28, 2014

(65) Prior Publication Data

US 2014/0356657 A1 Dec. 4, 2014

(30) Foreign Application Priority Data

May 28, 2013 (JP) .................... 2013-112187

(51) Int. Cl.
| | | |
|---|---|---|
| *H01M 10/63* | (2014.01) | |
| *H01M 2/20* | (2006.01) | |
| *H01M 10/48* | (2006.01) | |
| *H01M 10/625* | (2014.01) | |
| *H01M 10/6553* | (2014.01) | |
| *H01M 10/6563* | (2014.01) | |
| *H01M 10/655* | (2014.01) | |

(Continued)

(52) U.S. Cl.
CPC ......... *H01M 10/502* (2013.01); *H01M 2/206* (2013.01); *H01M 10/482* (2013.01); *H01M 10/486* (2013.01); *H01M 10/613* (2015.04); *H01M 10/625* (2015.04); *H01M 10/63* (2015.04); *H01M 10/655* (2015.04); *H01M 10/6553* (2015.04); *H01M 10/6563* (2015.04); *H01M 10/647* (2015.04); *H01M 2220/20* (2013.01)

(58) Field of Classification Search
USPC ..................................... 429/61–62
See application file for complete search history.

(56) References Cited

U.S. PATENT DOCUMENTS

| | | | | |
|---|---|---|---|---|
| 7,189,474 B2 * | 3/2007 | Hamada | ............. | H01M 2/1022 |
| | | | | 429/120 |
| 2001/0014417 A1 * | 8/2001 | Etou | ................... | H01M 2/0242 |
| | | | | 429/66 |

(Continued)

FOREIGN PATENT DOCUMENTS

| | | |
|---|---|---|
| JP | 2000-040535 | 2/2000 |
| JP | 2003-197279 | 7/2003 |

(Continued)

OTHER PUBLICATIONS

Office Action dated Jul. 28, 2015 issued in corresponding Japanese Application No. 2013-112187 (3 pages).

(Continued)

*Primary Examiner* — Osei Amponsah
(74) *Attorney, Agent, or Firm* — Nixon & Vanderhye P.C.

(57) ABSTRACT

The battery pack includes battery cells, bus bars provided for electrical connection among the battery cells, a fluid device that passes a heat transfer medium for exchanging heat with the bus bars or the battery cells, and a control device that obtains data on the bus bars or the battery cells and controls the fluid device based on the obtained data.

6 Claims, 10 Drawing Sheets

(51) Int. Cl.
*H01M 10/613* (2014.01)
*H01M 10/647* (2014.01)

(56) References Cited

U.S. PATENT DOCUMENTS

| | | | |
|---|---|---|---|
| 2006/0078786 A1* | 4/2006 | Wu | H01M 2/1022 |
| | | | 429/62 |
| 2007/0298315 A1* | 12/2007 | Yamamoto | H01M 10/425 |
| | | | 429/62 |
| 2009/0253029 A1 | 10/2009 | Inoue | |
| 2010/0075206 A1* | 3/2010 | Tamura | H01M 2/1077 |
| | | | 429/62 |
| 2010/0255360 A1 | 10/2010 | Umemoto et al. | |
| 2011/0020686 A1 | 1/2011 | Yamamoto et al. | |
| 2013/0224539 A1* | 8/2013 | Hayashi | H01M 2/1055 |
| | | | 429/82 |

FOREIGN PATENT DOCUMENTS

| | | |
|---|---|---|
| JP | 2005-310596 | 11/2005 |
| JP | 2007-234371 | 9/2007 |
| JP | 2009-252417 | 10/2009 |
| JP | 2010-225583 | 10/2010 |
| JP | 2010-244732 | 10/2010 |

OTHER PUBLICATIONS

Office Action (3 pages) dated Apr. 14, 2015, issued in corresponding Japanese Application No. 2013-112187 and English translation (4 pages).

* cited by examiner

BATTERY PACK AND BATTERY PACK APPARATUS

This application claims priority to Japanese Patent Application No. 2013-112187 filed on May 28, 2013, the entire contents of which are hereby incorporated by reference.

BACKGROUND OF THE INVENTION

1. Field of the Invention

The present invention relates to a battery pack including a plurality of battery cells and a temperature adjustment device and a battery pack apparatus including a plurality of the battery packs.

2. Description of Related Art

Japanese Patent Application Laid-open No. 2009-252417 describes a temperature adjustment device for a battery pack apparatus including a plurality of battery cells. This temperature adjustment device is provided with cooling fins formed in an electrode part provided for electrical connection with the plurality of the battery cells.

Conventionally, such a temperature control device performs temperature control using a fluid device (air fan, for example) provided commonly to a plurality of battery packs each including a plurality of battery cells, which blows air as heat transfer medium to the plurality of the battery packs through a duct. Accordingly, it is not possible to perform temperature control independently for each of the plurality of the battery packs.

This temperature control device includes a device box in which its control part is housed. The device tor and the fan are disposed separately in a case for housing the plurality of the battery packs. Within this case, a plurality of terminal parts of their battery packs are disposed separately from one another. As explained above, the above described conventional battery pack apparatus provided with the temperature control device includes a large number of parts and components.

SUMMARY

An exemplary embodiment provides a battery pack including:
- battery cells;
- bus bars provided for electrical connection among the battery cells;
- a fluid device that passes a heat transfer medium for exchanging heat with the bus bars or the battery cells; and
- a control device that obtains data on at least one of the bus bars and the battery cells and controls the fluid device based on the obtained data.

The exemplary embodiment provides also a battery pack apparatus including a plurality of the battery packs recited above, the control device and the fluid device of each of the plurality of the battery packs operating independently of the other battery packs.

According to the exemplary embodiment, there is provided a battery pack apparatus including a plurality of battery packs, each of the battery packs being capable of performing temperature control of its battery cells independently of the other battery packs, and being easy to handle during an assembling process and a disassembling process.

Other advantages and features of the invention will become apparent from the following description including the drawings and claims.

PREFERRED EMBODIMENTS OF THE INVENTION

Figure 1:
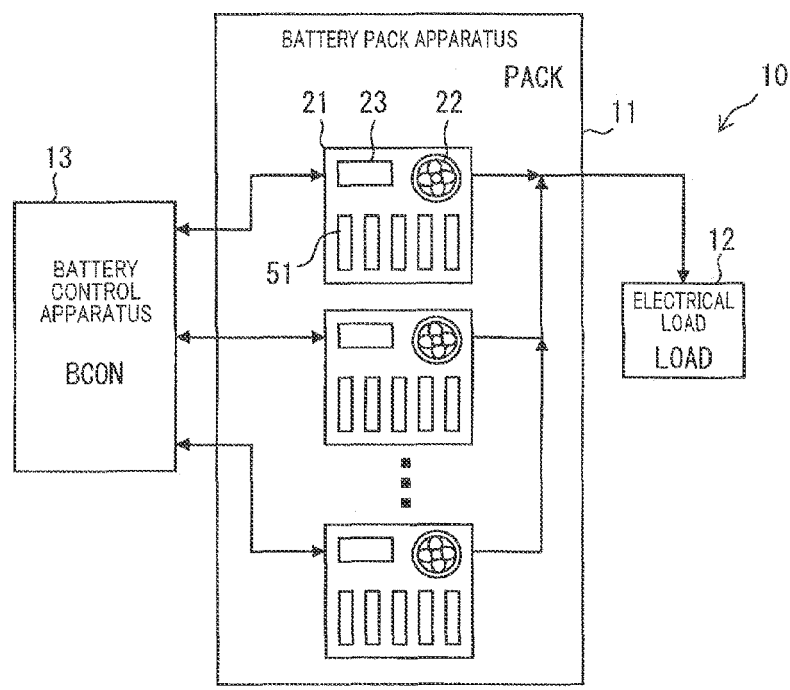
FIG. 1 is a block diagram of a vehicle-use battery system including a battery pack apparatus according to a first embodiment of the invention.

In the below described embodiments, parts or components which are the same or equivalent to those described in the preceding embodiments may be designated by the same reference numerals or characters. In the below described embodiments, when only part of the entire structure is explained, descriptions of the preceding embodiments can be referred to for the other parts. To avoid redundant explanation, some of the parts or components are designated by reference numerals which differs in the hundred's place from those used in the preceding embodiments. It should be noted that two or more of the below described embodiments can be combined when there is a statement to that effect, or if no substantive obstacle is expected in the combination.

First Embodiment

FIG. 1 is a block diagram of a vehicle-use battery system 10 including a battery pack apparatus according to a first embodiment of the invention. The battery system 10 is amounted on a vehicle such as a ground vehicle, an aircraft or a vessel. The battery system 10 includes the battery pack apparatus (PACK) 11, a load (LOAD) 12 and a battery control apparatus (BCON) 13. The battery system 10 supplies power from the battery pack apparatus 11 to the load 12 under control of the battery control apparatus 13.

The battery pack apparatus 11 include a plurality of battery modules 21 as a plurality of battery packs. Each battery module 21 includes a plurality of battery cells 51 and a battery pack temperature adjustment device for adjusting the temperatures of the battery cells included therein.

Each battery module 21 further includes a module control device 23 and a fan 22. The battery cells 51 included in each battery module 21 are connected to one another in series and in parallel. The module control device 23 receives data on the battery cells 51 from the battery cells, and controls the fan 22 in accordance with the received data. The module control devices 23 of the respective battery modules 21 control the fans 22 independently of one another so that the temperatures of the battery cells 51 in the respective battery modules 21 are maintained within a predetermined target temperature range. The fan 22 is an electric fan including an electric motor. The fan 22 blows heat transfer medium usable to control the temperatures of the battery cells 51 toward a part of the battery cells 51, for example, toward the vicinity of its cell terminals. The fan 22 includes axial-flow blades.

The battery modules 21 are connected in series and in parallel with one another inside the battery pack apparatus 11. Accordingly, the battery pack apparatus 11 serves as a high-voltage and large-power DC power supply.

The load 12 is an electrical load mounted on the vehicle. The load 12 may be an electric motor for driving the vehicle, or an electric motor for driving a refrigerating cycle device of an air-conditioning unit of the vehicle.

The battery control apparatus 13 communicates with the module control devices 23 to supply data to the module control devices 23 to enable them to operate independently of one another. In this embodiment, the battery control apparatus 13 supplies data indicating the temperature of the heat transfer medium usable for adjusting the temperatures of the battery cells 51. When the battery cells 51 are cooled by air obtainable around the battery pack apparatus 11, data indicating the temperature of the ambient air is supplied. In addition, the battery control apparatus 13 provides comprehensive control function to the battery modules 21.

Each of the battery control apparatus 13 and the module control device 23 is a microcomputer-based ECU (Electronic Control Unit) including a CPU and a memory (MMR) as a storage medium for non-temporarily storing programs to be executed by the CPU. The storage medium may be a semiconductor memory or a magnetic disk. Various functions and control processes described in this specification of the battery control apparatus 13 and the module control device 23 are implemented by executing the programs stored in the storage medium. Each of functional constituent elements provided by the battery control apparatus 13 and the module control device 23 may be referred to as means which operates to provide its function. Each of organic combinations of two or more of such functional constituent elements may be referred to as a block or a module.

Figure 2:
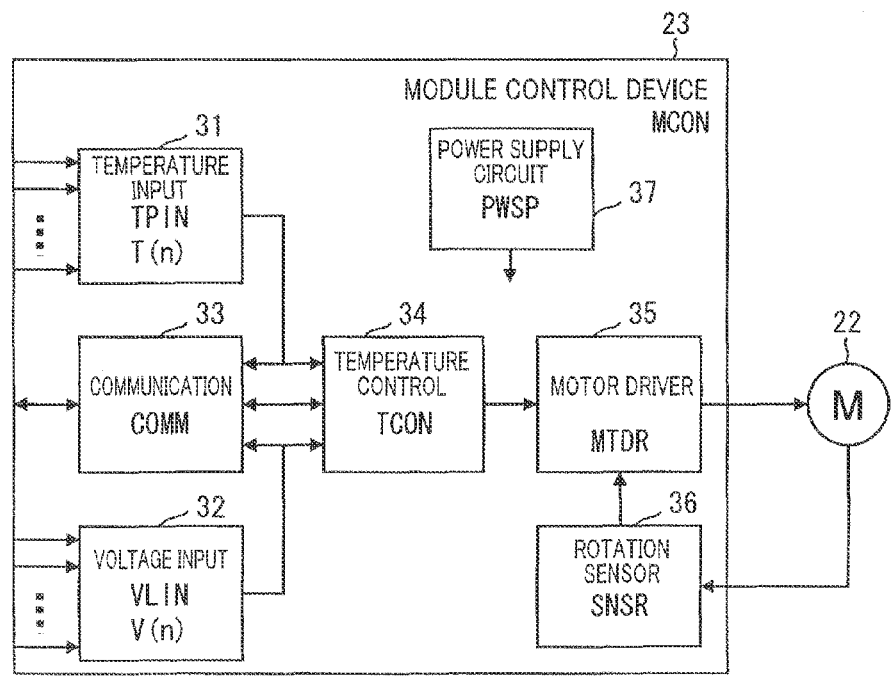
FIG. 2 is a block diagram of a module control device included in the battery pack apparatus according to the first embodiment.

Returning to FIG. 2, the module control device (MCON) 23 includes a plurality of functional constituent elements as described below. The module control device 23 includes a temperature receiving part (TPIN) 31 for receiving data indicating the temperatures T(n) of the battery cells 51, a voltage receiving part (VLIN) 32 for receiving the voltage V(n) of the battery cells 51, and a communication part (COMM) 33 for communication with the host control apparatus, that is, the battery control apparatus 13. The communication part 33 can provide the battery control apparatus 13 with data indicating the temperatures T(n), voltages V(n) and the operation state of the module control device 23 through communication.

The module control device 23 further includes a temperature control part (TCON) 34 which controls the fan 22 such that the temperatures T(n) indicated by the data received in the temperature receiving part 31 are maintained within the target temperature range. The temperature control part 34 operates as a feedback control device for controlling the temperature of the battery module 21. That is, the temperature control part 34 of each of the battery modules 21 constitutes a stand-alone temperature control system for controlling the temperature of the battery module 21 in itself.

The temperature control part 34 also controls the fan 22 in accordance with the ambient temperature and the voltages V(n). The ambient temperature and the voltages V(n) can be reflected in the feedback control as factors affecting the temperatures of the battery cells 51.

The temperature receiving part 31, the voltage receiving part 32, the communication part 33 and the temperature control part 34 are implemented, by the microcomputer.

The module control device 23 includes a driver (MTDR) 35 which supplies power to the motor of the fan 22, and controls the rotational speed of the motor by controlling the power. The module control device 23 further includes a rotation sensor (SENSOR) 36 for detecting the rotational angle of the motor of the fan 22. The driver 35 controls the power supplied to the motor in accordance with the rotational angle of the motor detected by the rotation sensor 36. When the motor is a three-phase motor, the driver 35 supplies three-phase power in synchronization with the rotational phase of the motor.

The temperature control section 34 generates a control signal for controlling the fan 22 as a fluid device in order that the flew rate of the heat transfer medium is adjusted in accordance with the temperatures of the bus bars or the battery cells 51. In this embodiment, the temperature control part 34 outputs a control signal for adjusting the rotational speed of the fan 22, that is, the flow rate of the fan 22 to the fan 22.

The driver 35 controls power supplied to the motor of the fan 22 in accordance with the control signal received from the temperature control section 34. In this embodiment, the control signal generated by the temperature control part 34 indicates a duty ratio corresponding to the rotational speed of the fan 22 necessary to keep the temperatures of the battery cells 51 within the target temperature range. The driver 35 applies a voltage having the duty ratio shown by the control signal to the motor. As a result, the fan 22 is control led by the module control device 23 so that the temperatures of the battery cells 51 are maintained within the target temperature range.

The module control device 23 includes a power supply circuit (PWSP) 37 for supplying power to both the temperature central part 34 and the driver 35. The power supply circuit 37 is a circuit commonly usable by the components disposed in the module control device 23. In this embodiment, the microcomputer implementing the temperature control part 34 and the driver 35 are disposed in the module control device 23. Accordingly, both the microcomputer and the driver 35 can use the power supply circuit 37. This configuration flakes it possible to reduce the circuit scale necessary to supply power to the temperature control part 34 and the driver 35 compared to a configuration where the temperature control part 34 and the driver 35 are disposed in different control devices.

As shown in FIGS. 3, 4, 5 and 6, the battery module 21 has a rectangular outer shape. The module control device 23 and the fan 22 are disposed on the top surface of the battery module 21. Module terminals 25 and 26 as positive and negative terminals are disposed respectively at both ends of the battery module 21. The battery module 21 includes a case 41, a holder 42 and a cover 43. The battery module 21 further includes the bus bars 44 disposed on its top surface. The bus bars 44 are metal plates for electrical connection among the battery cells 51. The bus bars 44 are held by the holder 42. The module control device 23 and the fan 22 are held by the cover 43.

The battery module 22 incorporates the battery cells 51. Each battery cell 51 is a packaged rechargeable battery, and has a flat rectangular shape. Each battery cell 51 includes a pair of the cell terminals 52 disposed on the top surface of its body with a certain distance therebetween so as to project from the top surface. The normal installation state of the battery cells 51 is such that their cell terminals 52 are placed upward. The battery cells 51 are housed in and held by the battery module 21 so as to maintain this normal installation state.

The battery cell 51 includes a sensor part 53 for detecting its own temperature T(n) and the voltage V(n). The sensor part 53 may include a temperature sensing element such as a thermistor disposed in the battery cell 51. The sensor part 53 may be configured to use tire cell terminals to detect the voltage V(n).

The case 41 has a shape of a box open at its top. The case 41 may be made of metal or resin. The battery cells 51 are housed in the case 41 such that they are arranged in parallel with one another with a regular spacing. The case 41 may include slots for receiving the battery cells 51. The case 41 includes a ventilation passage 41a formed between each adjacent two of the battery cells 51. The ventilation passage 41a is forced in a shape of an elongated slit.

The holder 42 is made of a plate-like member, and disposed so as to cover almost the top end opening of the case 41. The holder 42 includes a ventilation passage 42a formed between each adjacent two of the battery cells 51. The ventilation passage 42a is formed in a shape of an elongated slit. Some of the ventilation passages 42a serve as passages for allowing air to flow under the bus bar 44. Hence, the holder 42 provides passages for passing the heat transfer medium along both surfaces of each bus bar 44.

The holder 42 is made of electrically insulating resin material. The holder 42 holds the bus bars 44 and the module terminals 25 and 26. The bus bars 44 and the module terminals 25 and 26 serve as terminal boards for electrical connection.

The holder 42 is shaped such that these terminal boards can be placed at positions appropriate for connections with the cell terminals 52. The bus bars 44 are arranged in two rows extending in the longitudinal direction of the battery module 21 so as to correspond to the positions at which the cell terminals 52 are arranged.

The holder 42 holds the bus bars 44 and the module terminals 25 and 26 such that they do not easily become detached from the holder 42. Accordingly, the holder 42 enables handling the bus bars 44 and the module terminals 25 and 26 all together. The holder 42 allows each of the bus bars 44 and the module terminals 25 and 26 to move slightly. Accordingly, it is possible to connect the bus bars 44 and the module terminals 25 and 26 to the cell terminals 52 despite certain degree of dimensional errors.

In this embodiment, the holder 42 is formed with recesses. The bus bars 44 and the module terminals 25 and 26 are fitted and held in theses recesses.

The bus bars 44 and the module terminals 25 and 26 include connecting part for receiving the cell terminals 52 so that they cam be electrically connected to the cell terminals 52 by fastening members 54 such as nuts.

Figure 7:
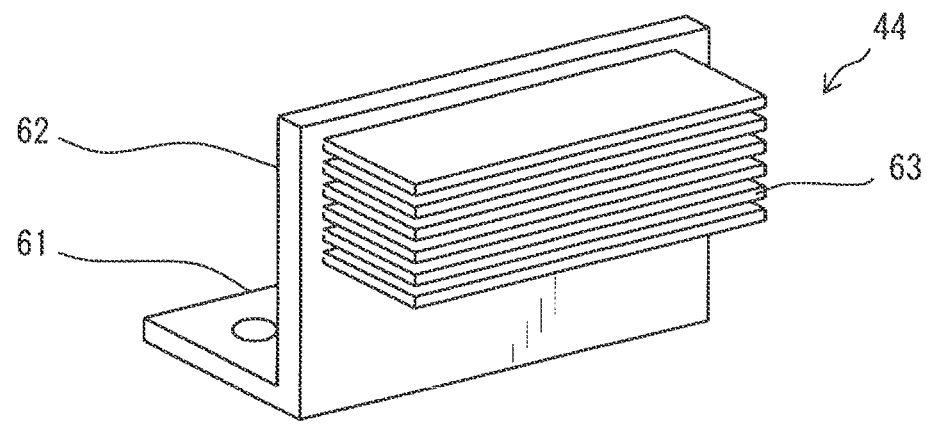
FIG. 7 is a perspective view of a bus bar included in the battery pack apparatus according to the first embodiment.

As shown in FIG. 7, the bus bar 44 has an L-shaped cross section. The bus bar 44 includes the connecting part 61 for electrical connection with the two cell terminals 52. The connecting part 51 is a plate-like part extending in the direction parallel to the longitudinal direction of the holder 42. The bus bar 44 further includes a heat transferring part 62 extending from the connecting part 61 so as to project vertically from one lateral side of the connecting part 61. The heat transfer part 62 is provided with a heat exchanging part 63 for exchanging heat with air. The heat exchanging part 63, which may be called a heat sink, is constituted of a plurality of fins. The connecting part 61, the heat transferring part 62 and the heat exchanging part 63 are integrally made of metal material.

Returning to FIGS. 3 to 6, the bus bars 44 are disposed such that the connecting part 61 is located more outside than the heat transferring part 62 and the heat exchanging part 63. In other words, the bus bars 44 are disposed such that the heat exchanging part 63 is directed between the cell terminals 52. The heat exchanging part 63 is located so as to jut over the ventilation passage 42a.

The cover 43, which is disposed above the holder 42, has a shape of a box open at its bottom, and is more elongated than the case 41. The cover 43 is disposed such that the cell terminals 42 and the fastening members 54 are placed outside thereof along both sides thereof, and the heat transferring parts 62 and the heat exchanging parts 63 are placed inside thereof along both sides thereof.

The cover 43 covers the center portion of the holder 42 along the longitudinal direction of the battery module 21. The cover 43 also covers the ventilation passages 42a, the heat transferring parts 62 and the heat exchanging parts 63. The cover 43 forms therein an air passage located between the cover 43 and the holder 42. The heat exchanging parts 63 are located within this air passage. The bus bars 44 are disposed so as to be exposed to the passage for passing the heat transfer medium for exchanging heat with the heat transfer medium to enable temperature adjustment of the bus bars 44.

The fan 22 is mounted on the cover 43. The fan 22 is a fluid device that passes air as the heat transfer medium for exchanging heat with the bus bars 44 or the battery cells 51.

The module control device 23 is mounted on the cover 43. The module control device 33 is a device that obtains data on the bus bars 44 or the battery cells 51 and controls the fan 22 in accordance with the obtained data. More specifically, the module control device 23 feedback-controls the fan 23 in order that the temperatures of the bus bars 44 or the battery cells 51 are maintained within the target temperature range.

The module control device 23 includes a circuit 27 disposed in a circuit container 28 so as to be slightly movable relative to the circuit container 28 for absorbing thermal expansions of the cover 43 and the circuit 27. More specifically, only a part of the circuit 27 is fixed to the circuit container 28 by a screw 29, and the other parts are retained by the circuit container 28. The module control device 23 is disposed such that its heat generating components are exposed to the inside of the cover 43 to dissipate heat to the air within the cover 43. That is, the circuit 27 of the module control device 23 is disposed so as to exchange heat with the heat transfer medium.

The cover 43 includes a connecting part 45 provided between the fan 22 and the module control device 23 for joining the cover 43 and the fan 22 together.

Figure 3:
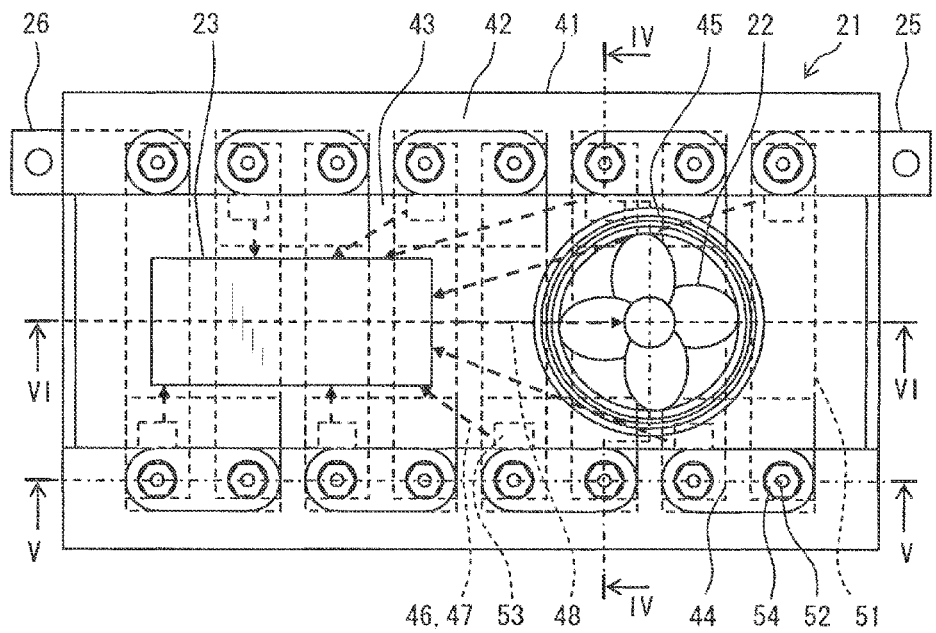
FIG. 3 is a plan view of a battery module included in the battery pack apparatus according to the first embodiment.
Figure 4:
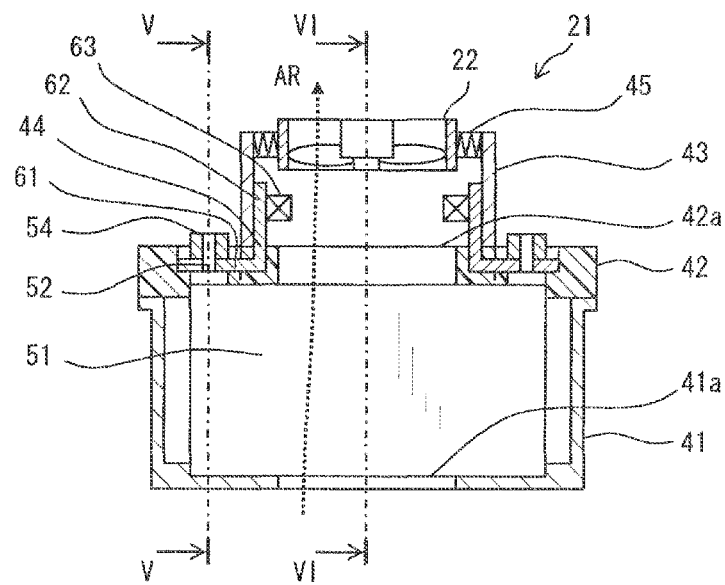
FIG. 4 is a sectional view of FIG. 3 taken along line IV-IV.
Figure 5:
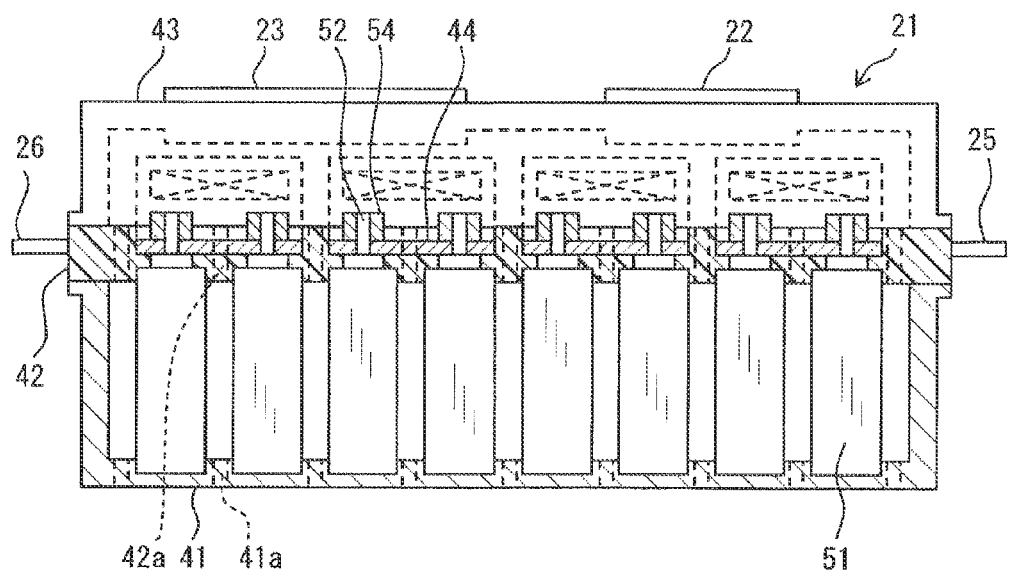
FIG. 5 is a sectional view of FIG. 3 taken along line V-V.
Figure 6:
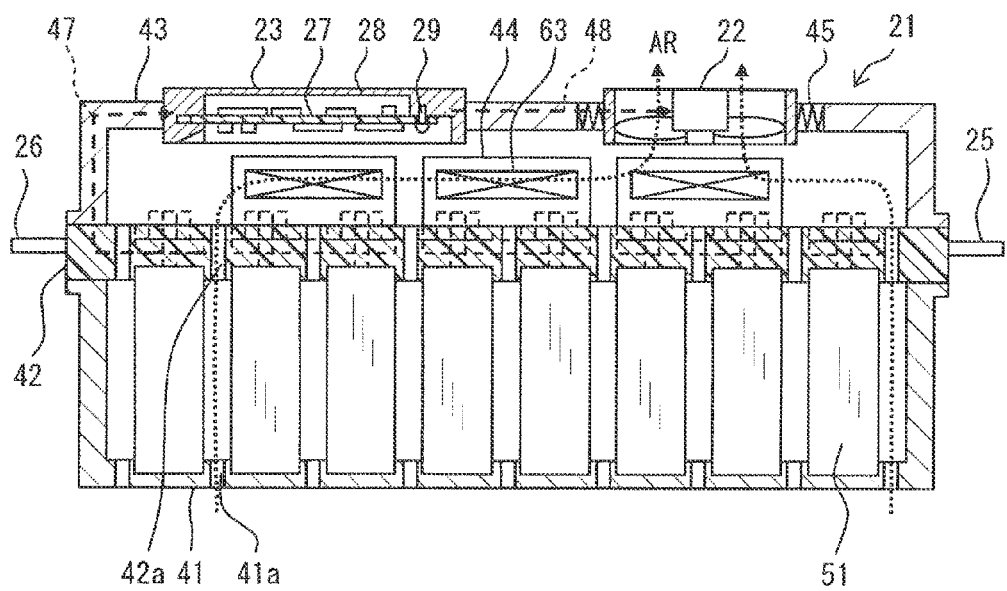
FIG. 6 is a sectional view of FIG. 3 taken along line VI-VI

As shown in FIGS. 3 and 6, the battery module 21 includes pairs of electric cables 46 and 47 and an electric cable 48. These cables are respectively adhered to or embedded in the members that are provided with these cables respectively.

The electric cables 46 are laid on the holder 42. The electric cables 47 are laid on the cover 43. The electric cables 46 and 47 may be connected by a connector. Each pair of the electric cables 46 and 47 connects the corresponding sensor part 53 to the module control device 23. Each pair of the electric cables 46 and 47 serves as a signal line for transmitting a signal indicating a physical quantity of the corresponding battery cell 51 measured by the sensor part 53 to the module control device 23.

The electric cable 43 is laid on the cover 43 to connect the fan 22 to the module control device 23. The electric cable 48 is for supplying power controlled by the driver 35 to the fan 22.

Figure 8:
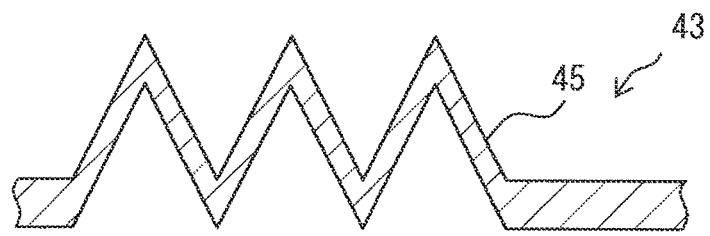
FIG. 8 is a partial enlarged view of the battery module of the first embodiment.

As shown in FIG. 8, the connecting part 45 is provided so as to surround the fan 22. The thickness of the connecting part 45 is smaller than the other parts of the cover 43. The connecting part 45 has a meander cross-section so that the vibration transmission distance from the fan 22 can be made long. The connecting part 45 is elastically deformed more easily when it has a meander cross-section than when it has a flat cross-section. Accordingly, the connecting part 45 has an excellent effect of reducing vibration transmitted from the fan 22.

The connecting part 45 is more flexible and more reversibly deformable than any other parts of the cover 43. The connecting part 45 may be called a flexible part or a low elastic part. The connecting part 45 suppresses vibration due to the fan 23 from transmitting to the other parts. Accordingly, the connecting part 45 may be called a vibration absorbing part or a vibration blocking part.

Since the connecting part 45 is an elastically and plastically deformable part, the mounting state of the fan 22 can be adjusted by deforming the connecting part 45. For example, it is possible to move the fan 22 in the axial direction and to direct the rotation axis of the fan 22 to any direction.

Figure 9:
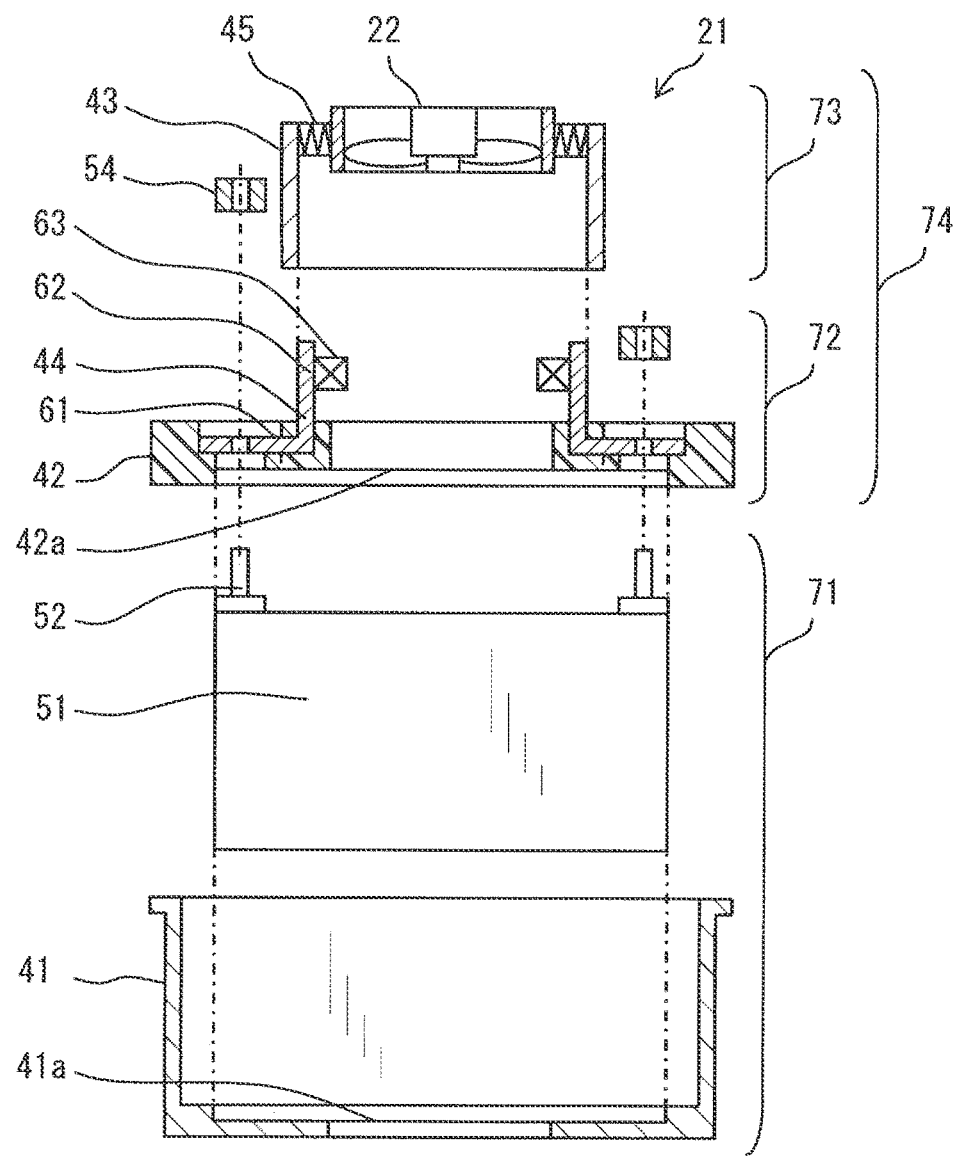
FIG. 9 is an exploded cross-sectional view of the battery module of the first embodiment.

Next, a process of manufacturing the above described battery module 21 is described. As shown in FIG. 9, the battery module 21 is manufactured by joining and assembling a case assembly 71, a bus bar assembly 72, a cover assembly 73 and a control equipment assembly 74. Each of the case assembly 71, the bus bar assembly 72, the cover assembly 73 and the control equipment assembly 74 may be called a sub-assembly or a unit that can be handled as one component during the manufacturing process.

The case assembly 71 is fabricated by housing and fixing the battery cells 41 in the case 41. The case 41 serves as a temporary holding member for temporarily positioning and holding the battery cells 51.

The bus bar assembly 72 is fabricated by mounting and holding the bus bars 44 and the module terminals 25 and 26 on the holder 42 using an appropriate procedure such as snapping, pressure-inserting and locking. The bus bars 44 are held so as not to come off the holder 42 while the bus bar assembly 72 is assembled to the case assembly 71. Accordingly, the holder 42 serves as a temporary holding member for temporarily positioning and holding the bus bars 44. As described above, since the bus bars 44 are assembled as one component to the bus bar assembly 72 all together, the manufacturing process can be expedited. The bus bar assembly 72 includes the fastening members 54. The bus bar assembly 72 is provided with the cables 46 to be connected to the sensor parts 53.

The cover assembly 73 is fabricated by mounting and fixing the module control device 23 and the fan 22 on the cover 43. Accordingly, the cover 43 serves as a holding member for fixing the module control device 23 and the fan 22. The cover assembly 73 is provided with the cables 47 and 48.

The holder assembly 72 is mounted on the case assembly 71. The cover assembly 73 is mounted on the holder assembly 72.

In the manufacturing process, the control equipment assembly 74 is fabricated by mounting the cover assembly 73 on the holder assembly 72, and thereafter the battery module 21 is fabricated by mounting the control equipment assembly 74 on the case assembly 71. Since the fan 22 and the module control device 23 for controlling the fan 22 depending on the state of the battery cells 51 are integrally assembled to the control equipment assembly 74, the manufacturing process can be expedited. The connecting parts 61 of the bus bars 44 and the cell terminal 52 are disposed outside the cover 43 without being covered by the cover 43. Accordingly, the fastening members 54 can be manipulated after fabrication of the control equipment assembly 74. The assemblies 71, 72, 73 and 74 can be joined to one another by snap-fitting, adhering, or bolt-tightening.

Next, operations of the battery module 21 including the battery cells 44 are explained.

The battery cells 51 are electrically connected in parallel and in series with one another by the bus bars 44. The battery cells 51 outputs to the module terminals 25 and 26. The power outputted from the battery module 21 is supplied to the load 12.

The sensor part 53 detects the states of the battery cells 51, and outputs data indicating the detected states to the module control device 23 through the cables 46 and 47. In this embodiment, the sensor part 53 detects the voltages V(n) and the temperatures T(n) of the battery cells 51. The module control device 23 drives and controls the fan 22 such that the temperatures of the battery cells 51 are maintained within the target temperature range.

The fan 22 sucks air as the heat transfer medium from inside the cover 43. The sucked air is introduced from the ventilation passages 41a and flows between the battery cells 51, as a result of which the temperatures of the battery cells 51 are adjusted. The air further flows into the air passage formed between the holder 42 and the cover 43 through the ventilation passages 42a. At this time, part of the air flows under the bottom surfaces of the bus bars 44 facing the battery cells 51, as a result of which the temperatures of the bus bars 44 are adjusted. The air flows in the direction along which the battery cells 51 are arranged between the holder 42 and the cover 43. At this time, part of the air flows over the top surface of the bus bars 44 not facing the battery cells 51. Further, the air flows along the heat transferring parts 62 and the heat exchanging parts 63, as a result of which the temperatures of the bus bars 44 are adjusted. In addition, the heat exchanging parts 63 promote heat exchange between the air and the bus bars 44.

That is, the bus bars 44 are cooled by heat dissipation from the bus bars 44 to the air. Since the bus bars 44 are firmly fixed to the cell terminals 52, the bus bars 44 are cooled. Accordingly, the battery cells are efficiently cooled. The air having cooled the heat transferring parts 63 is discharged to the outside by the fan 22.

As explained above, the fan 22 and the module control device 23 are integrally formed as one component, and joined to the battery cells 51 as one component. That is, the fan 22 and the module control device 23 can be handled as one component. More specifically, the fan 22 and the module control device 23 for controlling the fan 22 to adjust the temperatures of the battery cells 51 are formed integrally in the cover assembly 73. Accordingly, the battery pack temperature adjusting device for adjusting the temperature of the battery module 21 is provided by the cover assembly 73. The cover assembly 73 can be handled as one component or one assembly. The cover assembly 73 can be joined as one component to the case assembly 71 or the bus bar assembly 72. Hence, according to this embodiment, a battery pack apparatus and a battery pack temperature adjusting device which are easy to handle during a manufacturing process or a disassembling process are provided.

The battery pack temperature adjusting device may include the bus bar assembly 72 having the cables 47 for obtaining data on the battery cells 51. In this case, the battery pack temperature adjusting device is provided by the control equipment assembly 74. The control equipment assembly 74 can be handled as one component or one assembly. The control equipment assembly 74 can be joined as one component to the case assembly 71 without necessity of partially disassembling the control equipment assembly 74. Hence, the cables 46 for connection among the battery cells 51, the fan 22 and the module control device 23 can be handled easily during the manufacturing process or disassembling process of the battery pack apparatus and the battery pack temperature adjusting device.

This embodiment includes the holder 44 for holding the bus bars 44. Accordingly, the bus bars 44 can be handled as one component. In the bus bar assembly 72, the bus bars 44 and the module terminals 25 and 26 for electrical connection with the battery cells 51 are held by the single holder 42. The bus bars 44 and the module terminals 25 and 26 can be joined in the state of being held by the holder 42 to the case assembly 71, that is, to the battery cells 51. Accordingly, the bus bars 44 and the module terminals 25 and 26 of the battery pack apparatus of this embodiment can be handled with ease.

The battery module 21 includes the module control device 23 that can adjust the temperature of the battery cells 51 by itself. Accordingly, the temperature control can be performed in the respective battery modules 21 independently by supplying power to their module control devices 23. That is, according to this embodiment, the respective battery packs can perform the temperature control independently of one another.

Further, according to this embodiment, the battery modules 21 can be distributed within the vehicle.

The battery pack apparatus 11 includes the plurality of the battery modules 21 each including the battery cells 51, bus bars 44, the fan 22 and the module control device 23 can operate independently of one another.

Since the air passage is formed between the holder 42 and the cover 43, it is possible to pass the heat transfer medium for temperature adjustment without providing a duct. In addition, it is possible to reduce the parts count of the battery module 21. This makes it possible to reduce the number of the manufacturing steps and the manufacturing cost.

The cover 43 includes the fan 23 and the module control device 23. The cover 43 forms, with the holder 42, the passage enabling the heat transfer medium to flow over the battery cells 51. The holder 42 and the cover 43 are provided with the cables 46 and 47 as an electrical connection member for the module control device 23 to obtain data on the battery cells 51. Accordingly, the cover 43 and the holder 42 may be called a passage forming member for forming a passage enabling the heat transfer medium to flow to adjust the temperatures of at least the bus bars 44. The fan 22 and the module control device 23 are provided in this passage forming member. That is, the battery module 21 includes, in addition to the fan 22 and the module control device 23, a passage forming member for forming a passage for the heat transfer medium. The electrical connection member for obtaining data on the battery cells 51 is also included in the passage forming member.

Second Embodiment

Figure 10:
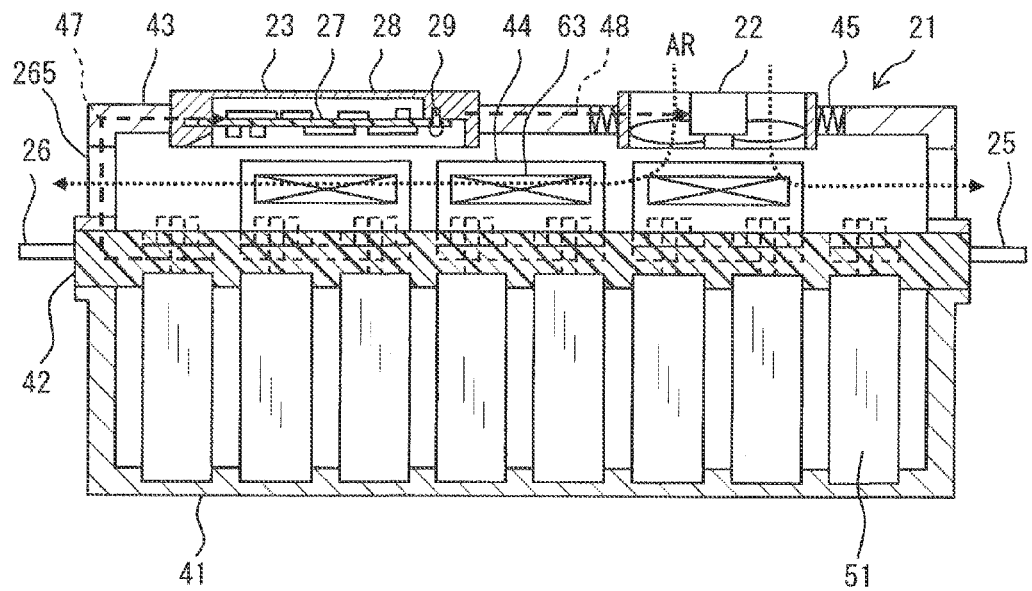
FIG. 10 is a cross-sectional view of a battery module of a second embodiment of the invention.

Next, a second embodiment of the invention is described with a focus on differences with the first embodiment, as shown in FIG. 10, the second, embodiment includes a ventilation passage 265 in place of the ventilation passages 41a and 42a. The ventilation passage 265 is provided in the cover 43. The ventilation passage 265 is located at each end of the air passage formed between the holder 42 and the cover 43. The fan 22 sucks air from outside the battery module 21 and blows the air to the air passage so that the temperatures of the bus bars 44 are adjusted to thereby adjust the temperatures of the battery cells 51.

Third Embodiment

Figure 11:
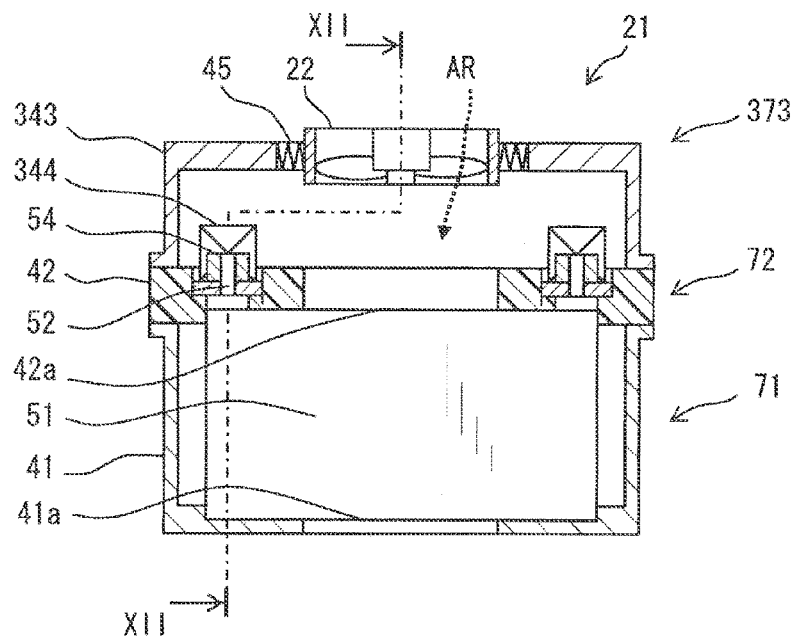
FIG. 11 is a cross-sectional view of a battery module of a third embodiment of the invention.
Figure 12:
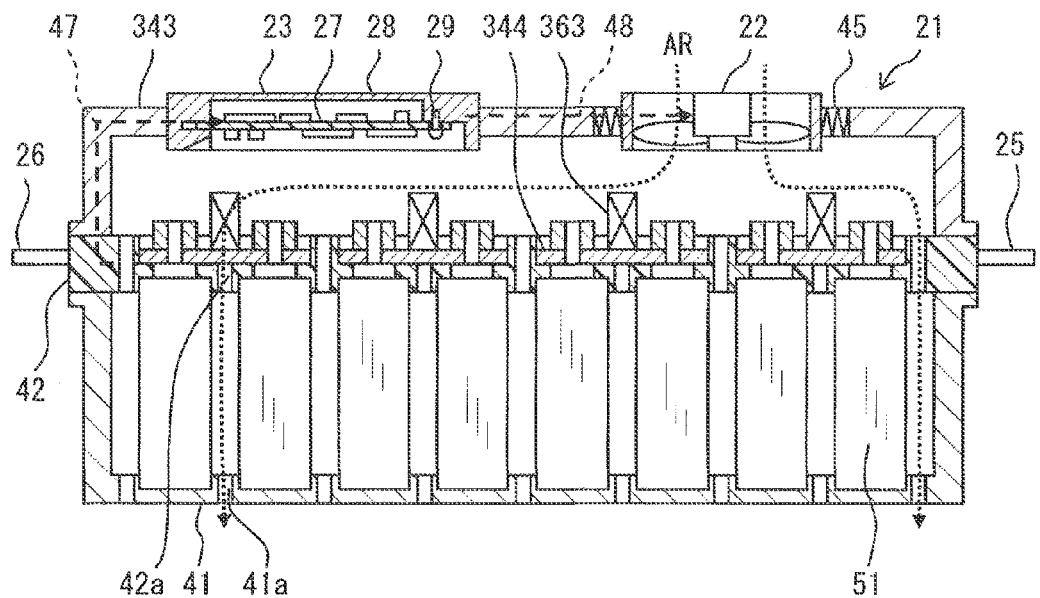
FIG. 12 is a cross-sectional view of the battery module of the third embodiment.

Next, a third embodiment of the invention is described with a focus on differences with the preceding embodiments. As shown in FIGS. 11 and 12, in the third embodiment, a cover 343 is shaped and disposed so as to cover bus bars 344 and the cell terminals 52.

Figure 13:
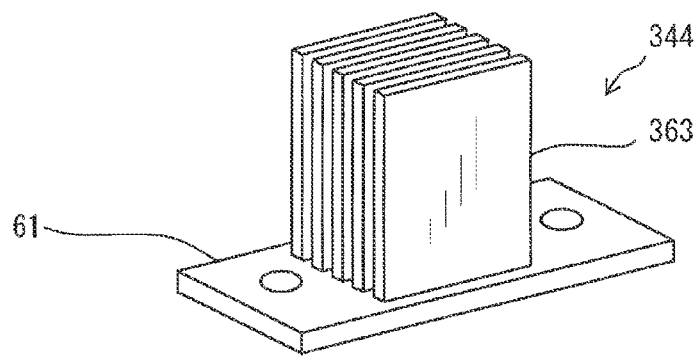
FIG. 13 is a perspective view of a bus bar of the third embodiment.

As shown in FIG. 13, the bus bar 344 includes the connecting part 61 and a heat exchanging part 363. The connecting part 61 includes two receiving portions for receiving the cell terminals 52. The heat exchanging part 363 is directly fixed to the connecting part 61 so as to be located between the two receiving portions.

A manufacturing process for manufacturing the battery module 21 of this embodiment is as follows. First, the bus bar assembly 72 is mounted to the case assembly 71. Next, the fastening members 54 are manipulated to electrically connect the bus bars 44 to the cell terminals 52. Thereafter, a cover assembly 373 is mounted on the bus bar assembly 72. Since the cover 343 covers the bus bars 344 and the fastening members 54, the cover assembly 373 is fixed after the bus bar assembly 72 is fixed. Accordingly, in this embodiment, the bus bar assembly 72 and the cover assembly 73 are not an integrated component, but separate components.

The fan 22 sucks air from outside the battery modules 21 and blows the air to the air passage between the holder 42 and the cover 343. At this time, the air exchanges heat with the heat exchanging part 363. As a result, the temperatures of the bus bars 344 are adjusted. Thereafter, the air is discharged to the outside through the ventilation passages 42a and 41a. At that time, the air passes between the battery cells 51 to adjust the temperatures of the battery cells 51.

In this embodiment, since the bus bars 44 and the module terminals 25 and 26 are held by the holder 42 within the bus bar assembly 72, the bus bars 44 and the module terminals 25 and 26 are easy to handle. Further in this embodiment, the fan 23 and the module control device 23 are integrally provided within the cover assembly 373. Hence, according to this embodiment, there are provided a battery pack apparatus and a battery pack temperature adjusting device whose fan 22 and module control device 23 are easy to handle during a manufacturing process or a disassembling process thereof.

Fourth Embodiment

Figure 14:
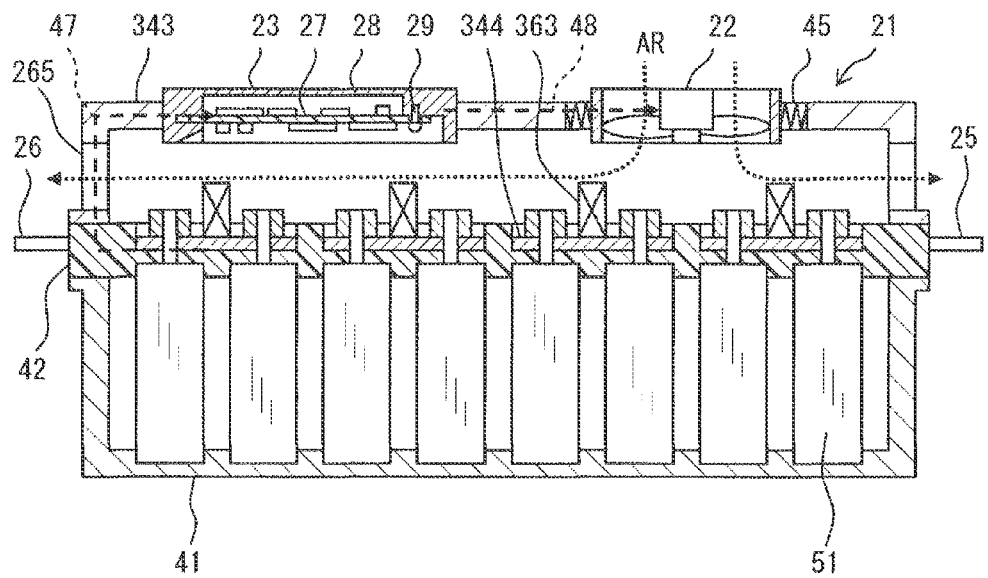
FIG. 14 is a cross-sectional view of a battery module of a fourth embodiment of the invention.

Next, a fourth embodiment of the invention is described with a focus on differences with the preceding embodiments. As shown in FIG. 14, this embodiment includes the ventilation passage 265 in place of the ventilation passages 41a and 42a. The ventilation passage 265 is provided in the cover 343. The ventilation passage 265 is located at each end of the air passage formed between the holder 42 and the cover 343. The fan 22 sucks air from outside the battery modules 21 and blows the air to the air passage.

Fifth Embodiment

Figure 15:
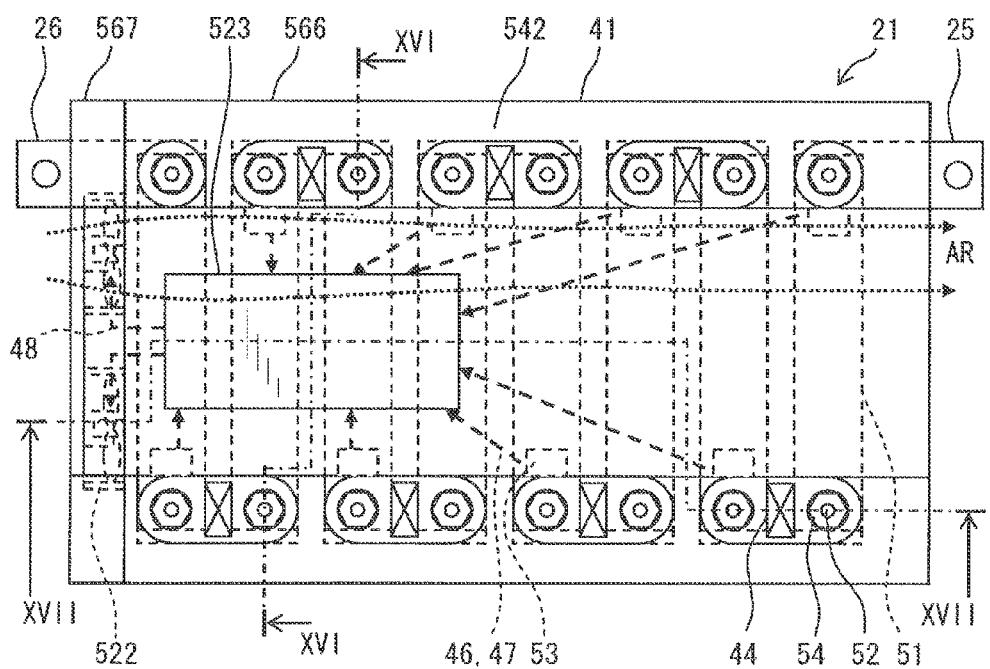
FIG. 15 is a plan view of a battery module of a fifth embodiment of the invention.
Figure 16:
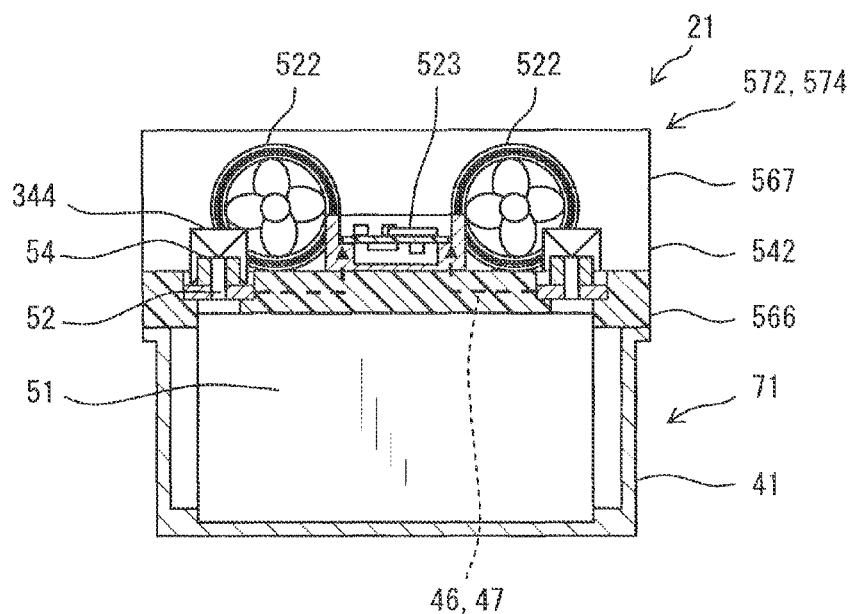
FIG. 16 is a sectional view of FIG. 15 taken along line XVI-XVI.
Figure 17:
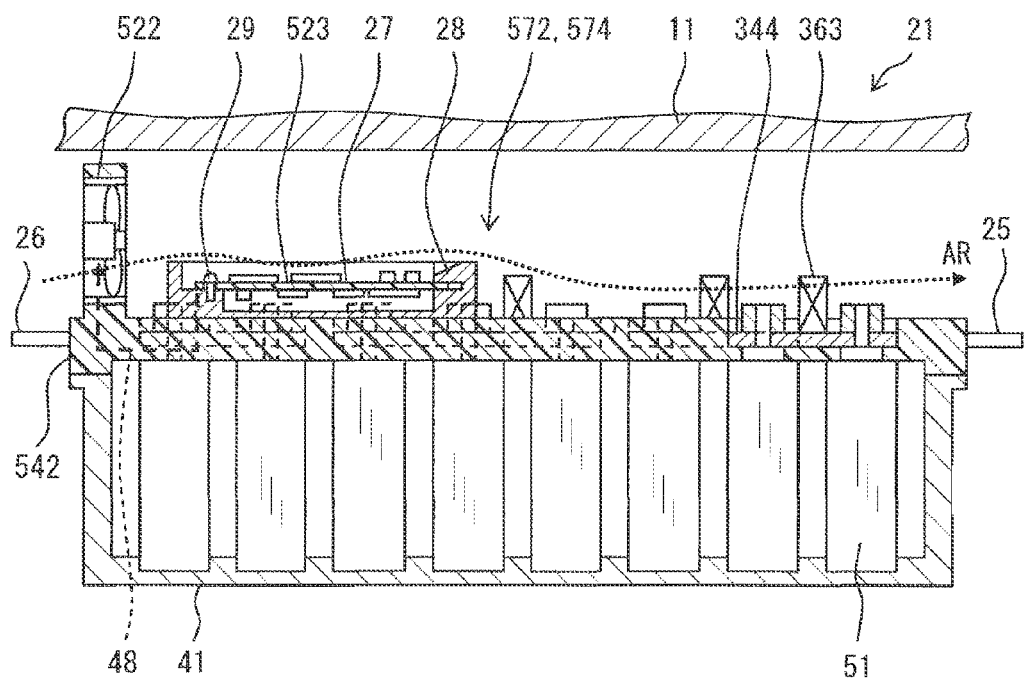
FIG. 17 is a sectional view of FIG. 15 taken along line XVII-XVII.

Next, a fifth embodiment of the invention is described with a focus on differences with the preceding embodiments. As shown in FIG. 15, the fifth embodiment includes a holder 542. As shown in FIGS. 16 and 17, the holder 542 includes a first part 566 and a second part 567.

The first part 566 is a plate-like part for covering the top opening of the case 41. Since the first part 566 covers the upper part of the case 41, it may be called a cover part. The first part 566 holds the bus bars 44 and a module control device 523. The module control device 523 is disposed so as to dissipate heat to outside the holder 542, that is to the air above the holder 542. More specifically, the module control device 523 is disposed such that its heat generating components are exposed to the outside.

The second part 566 is located at one end of the first part 566. The second part 567 is a plat-like part formed integrally with first part 566 so as to vertically extend, from the first part 566. The second part 567 holds two fans 522. The two fans 522 are disposed side by side on the second part 567 so that they blow air as the heat transfer medium along the surface of the first part 566.

The fifth embodiment does not include a cover. Since the battery module 21 is a component of the battery pack apparatus 11, an air passage is formed between a wall of the battery pack apparatus 11 and the holder 542. In this embodiment, the holder 542 is provided with the fans 522 and the module control device 523, and also serves as an air passage forming member to reduce the part count.

When the fans 522 are driven, an airflow AR is generated. The airflow AR passes over the module control device 532 to cool the module control device 532, that is, to adjust the temperature of the module control device 532. The airflow AR also passes over the bus bars 344 to cool the bus bars 344, that is, to adjust the temperature of the bus bars 344. Further, the airflow AR passes over the heat exchanging part 363 to cool the bus bars 344, that is, to adjust the temperature of the bus bars 344.

In this embodiment, since the bus bars 44 and the module terminals 25 and 26 are held by the holder 542 within a bus bar assembly 572, the bus bars 44 and the module terminals 25 and 26 are easy to handle. In this embodiment, the fans 522 and the module control device 23 are integrally provided in the holder 542. Accordingly, the bus bar assembly 572 is also a control equipment assembly 574. Hence, according to this embodiment, there are provided a battery pack apparatus and a battery pack temperature adjusting device whose fans 522 and module control device 523 are easy to handle during a manufacturing process or a disassembling process thereof.

Sixth Embodiment

Figure 18:
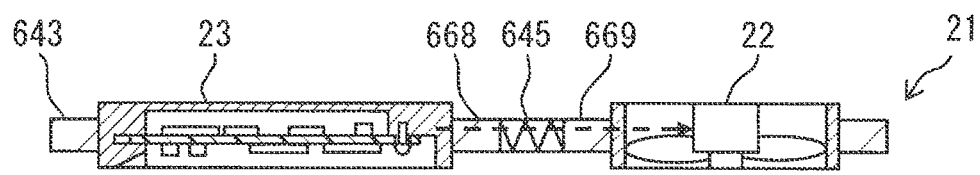
FIG. 18 is a partial cross-sectional view of a battery module of a sixth embodiment of the invention.

Next, a sixth embodiment of the invention is described with a focus on differences with the preceding embodiments. As shown in FIG. 18, in this embodiment, a cover 643 includes a first cover part 668 holding the module control device 23 and a second cover part 669 holding the fan 22. The first and second cover parts 668 and 665 have a level of rigidity high enough to prevent them from being bent. Between the first cover part 668 and the second cover part 669, a connecting part 645 is provided for joining the first and second cover parts 668 and 669 together. The connecting part 645 suppresses transmission of vibration from the second cover part 669 to the first cover part 668.

Figure 19:
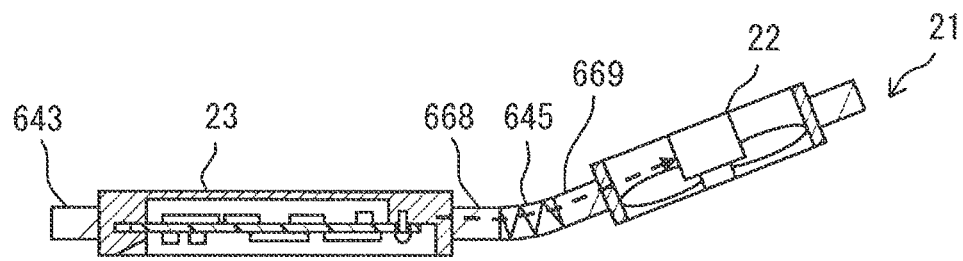
FIG. 19 is a partial cross-sectional view of the battery module of the sixth embodiment in a state of being used.

As shown in FIG. 19, the connecting part 645 is deformable so that it can be bent, expanded or contracted. By bending the connecting part 645, the direction of the rotation axis of the fan 22 can be adjusted.

Other Embodiments

It is a matter of course that various modifications can be made to the above described embodiments as described below.

The functions of the control device can be implemented by software, or hardware, or a combination of software and hardware. For example, the control device may be implemented by an analog circuit.

In the above embodiments, the fans 22 and 522 are a fan with axial-flow blades. However, they may be a fan with centrifugal blades. The heat transfer medium may be liquid such as water. In this case, a pump is used in place of the fan 22 or 522.

In the above embodiments, the sensor part 51 detects the temperature of the battery cell 51. However, the sensor part 51 may detect the temperature of the bus bar 44 or 344. In this case, the module control device 23 controls the fans 22 or 522 in accordance the temperatures of the bus bars 44 or 344.

The above explained preferred embodiments are exemplary of the invention of the present application which is described solely by the claims appended below. It should be understood that modifications of the preferred embodiments may be made as would occur to one of skill in the art.

What is claimed is:
1. A battery pack comprising:
battery cells;
bus bars configured to provide electrical connection among the battery cells;
a holder that holds the bus bars;
a cover which defines a passage along with the holder through which a heat transfer medium passes;
a fluid device that is configured to create a flow of the heat transfer medium in said passage to transfer heat generated by the bus bars or the battery cells to the heat transfer medium and
a control device that is configured to obtain data on at least one of the bus bars and the battery cells and control the fluid device based on the obtained data, wherein the bus bars are exposed to the passage,
the fluid device is provided in the cover, and
the control device includes a circuit and is disposed in and attached to the cover to have the circuit exposed to the flow of the heat transfer medium to transfer heat generated by the circuit to the heat transfer medium.

2. A battery pack comprising:
battery cells;
bus bars configured to provide electrical connection among the battery cells;
a holder that holds the bus bars, wherein the holder defines a passage, along with an adjacent wall, through which a heat transfer medium passes;
a fluid device that is configured to create a flow of the heat transfer medium in said passage to transfer heat generated by the bus bars or the battery cells to the heat transfer medium; and
a control device that is configured to obtain data on at least one of the bus bars and the battery cells and control the fluid device based on the obtained data, wherein
the bus bars are exposed to the passage,
the fluid device is provided in and attached to the holder, and
the control device includes a circuit and is disposed in and attached to the holder to have the circuit exposed to the flow of the heat transfer medium to transfer heat generated by the circuit to the heat transfer medium.

3. The battery pack according to claim 1, wherein
the battery pack includes
a joint part disposed between the fluid device and the control device, the joint part being configured to suppress vibration transmission from the fluid device to the control device.

4. The battery pack according to claim 3, wherein the joint part is deformable.

5. A battery system comprising:
a battery pack including a plurality of battery modules each including battery cells;
an electrical load connected to the battery pack; and
a battery control unit communicably connected to each of the battery modules to be individually controlled by the battery control unit, the battery control unit being configured to control the battery pack to supply power to the electrical load; wherein
each of the battery modules includes:
a fan that creates an air flow flowing through the battery cells, thereby cooling the battery cells; and
a control device that obtains data from the battery cells and controls the fan based on the obtained data, wherein
the battery pack comprises:
bus bars configured to provide electrical connection among the battery cells;
a holder that holds the bus bars;
a cover which defines a passage along with the holder through which a heat transfer medium passes;
the fan is configured to create a flow of the heat transfer medium in said passage to transfer heat generated by the bus bars or the battery cells to the heat transfer medium; and
the control device is configured to obtain data on at least one of the bus bars and the battery cells and control the fan based on the obtained data, wherein
the bus bars are exposed to the passage, the fan is provided in the cover; and
the control device includes a circuit and is disposed in the cover to have the circuit exposed to the flow of the heat transfer medium to transfer heat generated by the circuit to the heat transfer medium.

6. A battery system comprising:
a battery pack including a plurality of battery modules each including battery cells;
an electrical load connected to the battery pack; and
a battery control unit communicably connected to each of the battery modules to be individually controlled by the battery control unit, the battery control unit being configured to control the battery pack to supply power to the electrical load; wherein
each of the battery modules includes:
a fan that creates an air flow flowing through the battery cells, thereby cooling the battery cells; and
a control device that obtains data from the battery cells and controls the fan based on the obtained data, wherein
the battery pack comprises:
bus bars configured to provide electrical connection among the battery cells;
a holder that holds the bus bars, wherein the holder defines a passage, along with an adjacent wall, through which a heat transfer medium passes;
the fan is configured to create a flow of the heat transfer medium in said passage to transfer heat generated by the bus bars or the battery cells to the heat transfer medium; and
the control device is configured to obtain data on at least one of the bus bars and the battery cells and control the fan based on the obtained data, wherein
the bus bars are exposed to the passage, the fan is provided in and attached to the holder and
the control device includes a circuit and is disposed in the holder to have the circuit exposed to the flow of the heat transfer medium to transfer heat generated by the circuit to the heat transfer medium.

* * * * *